(12) United States Patent
Song et al.

(10) Patent No.: US 10,133,100 B2
(45) Date of Patent: Nov. 20, 2018

(54) CURVED DISPLAY DEVICE AND METHOD FOR MANUFACTURING THE SAME

(71) Applicant: Samsung Display Co., Ltd., Yongin-Si, Gyeonggi-Do (KR)

(72) Inventors: Sijoon Song, Suwon-si (KR); Yong-hoon Kwon, Hwaseong-si (KR); Sojeong La, Hwaseong-si (KR); Seokhyun Nam, Seoul (KR); Kwang-wook Choi, Cheonan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 152 days.

(21) Appl. No.: 15/200,034

(22) Filed: Jul. 1, 2016

(65) Prior Publication Data
US 2017/0160580 A1   Jun. 8, 2017

(30) Foreign Application Priority Data

Dec. 4, 2015 (KR) .......................... 10-2015-0172633

(51) Int. Cl.
*G02F 1/1333* (2006.01)
*F21V 8/00* (2006.01)
*G02B 6/00* (2006.01)
*G06F 1/16* (2006.01)

(52) U.S. Cl.
CPC ......... *G02F 1/133308* (2013.01); *G02B 6/00* (2013.01); *G02B 6/0051* (2013.01); *G02B 6/0053* (2013.01); *G02B 6/0055* (2013.01); *G02B 6/0068* (2013.01); *G02B 6/0088* (2013.01); *G06F 1/1652* (2013.01); *G02F 2001/133325* (2013.01); *G02F 2202/28* (2013.01)

(58) Field of Classification Search
CPC ... G02F 1/133308; G02B 6/00; G02B 6/0051; G02B 6/0053
USPC .......................................... 349/58
See application file for complete search history.

(56) References Cited

U.S. PATENT DOCUMENTS

| | | |
|---|---|---|
| 2005/0243238 A1 | 11/2005 | Cha et al. |
| 2005/0270733 A1 | 12/2005 | Lam et al. |
| 2006/0082700 A1 | 4/2006 | Gehlsen et al. |
| 2008/0160242 A1* | 7/2008 | Choi .................. B32B 5/18 428/41.8 |

(Continued)

FOREIGN PATENT DOCUMENTS

| | | |
|---|---|---|
| JP | 2011085740 A | 4/2011 |
| JP | 2015106045 A | 6/2015 |

(Continued)

*Primary Examiner* — Lucy Chien
(74) *Attorney, Agent, or Firm* — Cantor Colburn LLP

(57) ABSTRACT

A curved display device includes a display panel which is curved with respect to a central axis of the curved display device to define a display surface which is curved with respect to the central axis of the curved display device; a first adhesion member attached to an edge area of a bottom surface of the display panel; a mold frame which is curved with respect to the central axis of the curved display device, the mold frame defining a stepped portion on which the display panel is seated; and a second adhesion member attached to a top surface of the stepped portion and to the first adhesion member which is attached to the edge area of the bottom surface of the display panel.

15 Claims, 9 Drawing Sheets

(56) References Cited

U.S. PATENT DOCUMENTS

2009/0015747 A1* 1/2009 Nishizawa ........ G02F 1/133308
  349/58
2010/0255302 A1* 10/2010 Aoyama .................. B32B 7/12
  428/355 EN
2015/0029436 A1* 1/2015 Nakayama .......... G02F 1/13452
  349/58

FOREIGN PATENT DOCUMENTS

| KR | 1020050085066 A | 8/2005 |
| KR | 1020130026286 A | 3/2013 |
| KR | 1020140141142 A | 12/2014 |

* cited by examiner

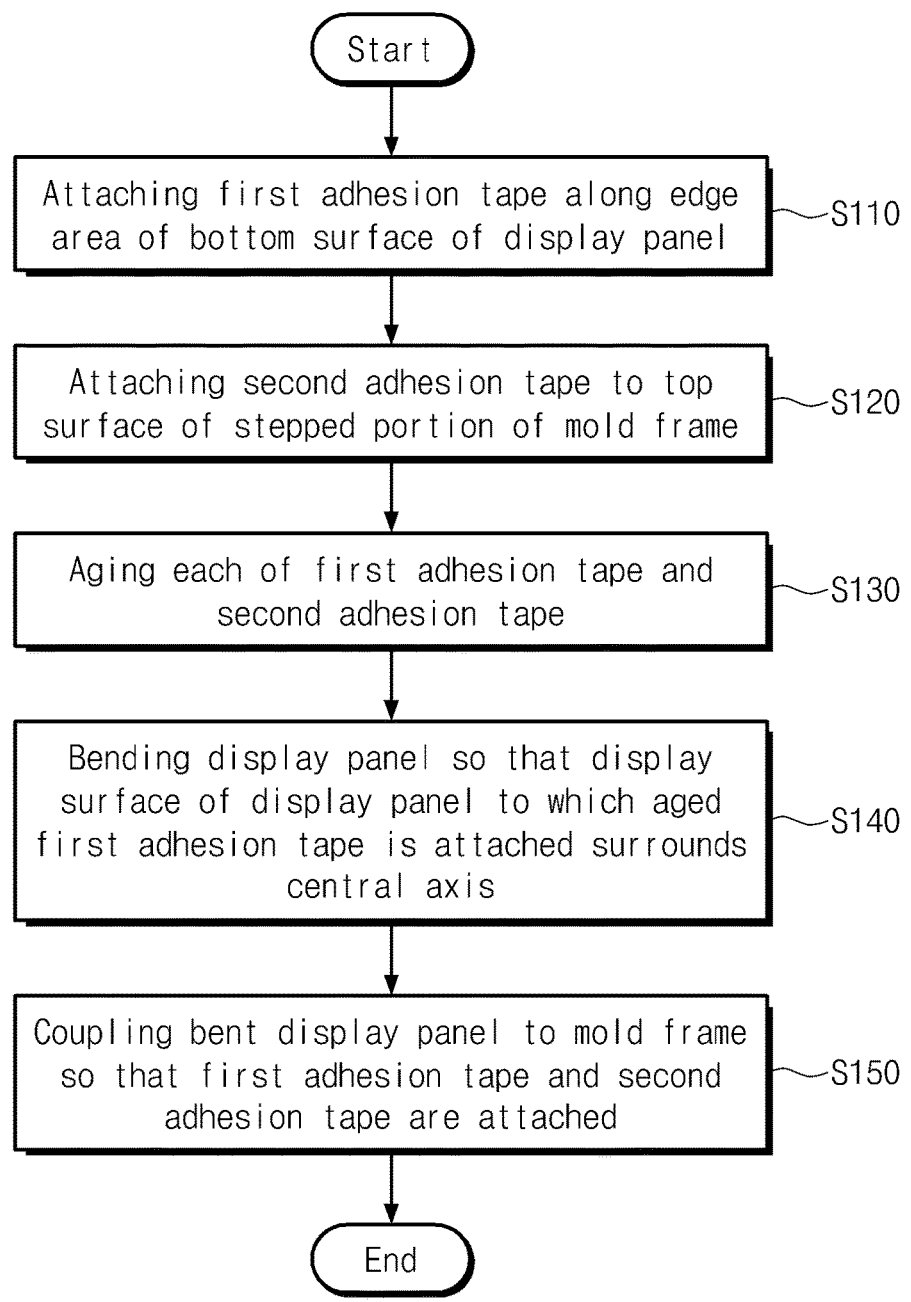

CURVED DISPLAY DEVICE AND METHOD FOR MANUFACTURING THE SAME

This application claims priority to Korean Patent Application No. 10-2015-0172633, filed on Dec. 4, 2015, and all the benefits accruing therefrom under 35 U.S.C. § 119, the contents of which in their entirety are hereby incorporated by reference.

BACKGROUND (1) Field

The invention relates to a display device, and more particularly, to a curved display device and a method for manufacturing the same.

(2) Description of the Related Art

Flat panel display devices are used for displaying an image on various information processing devices such as a television, a monitor, a notebook, a mobile phone, and the like. Display devices which have an overall bent shape to define curved display devices are being developed. These curved display devices may provide a display area having a bent shape to provide an image with improved three-dimensional effects and an improved sense of immersion and realism.

In general, flat panel display devices include a display panel for displaying an image with light, a mold frame on which the display panel is seated, and a backlight unit providing light to the display panel. Within the flat panel display devices, the display panel seated on the mold frame may be easily attached to the mold frame by an adhesive member such as by using an adhesion tape.

SUMMARY

One or more exemplary embodiment provides a display device which enables a display panel and a mold frame to be easily attached to each other to form a curved display device, and a method for manufacturing the same.

An exemplary embodiment of the invention provides a curved display device including: a display panel which is curved with respect to a central axis of the curved display device to define a display surface which is curved with respect to the central axis of the curved display device; a first adhesion member attached to an edge area of a bottom surface of the display panel; a mold frame which is curved with respect to the central axis of the curved display device, the mold frame defining a stepped portion on which the display panel is seated; and a second adhesion member attached to a top surface of the stepped portion and to the first adhesion member which is attached to the edge area of the bottom surface of the display panel.

In an exemplary embodiment, the display panel may include: a first display substrate; and a second display substrate disposed on the first display substrate, and the first adhesion member may be attached to an edge area of a bottom surface of the first display substrate.

In an exemplary embodiment, the first adhesion member may include in order from the display panel: a first adhesion layer attached to the bottom surface of the first display substrate; a first foam layer attached to a bottom surface of the first adhesion layer; a first base film layer attached to a bottom surface of the first foam layer; and a second adhesion layer attached to a bottom surface of the first base film layer.

In an exemplary embodiment, the second adhesion member may include in order from the stepped portion of the mold frame: a third adhesion layer attached to the top surface of the stepped portion; a second foam layer attached to a top surface of the third adhesion layer; a second base film layer attached to a top surface of the second foam layer; and a fourth adhesion layer attached to a top surface of the second base film layer and the second adhesion layer.

In an exemplary embodiment, the edge area of the bottom surface of the first display substrate may overlap a portion of the top surface of the stepped portion.

In an exemplary embodiment, the display panel may include a display area and a non-display area. The mold frame may define an opening thereof which corresponds to the display area, and the stepped portion may surround the opening.

In an exemplary embodiment, each of the first and second adhesion members may be a double-sided adhesion tape.

In an exemplary embodiment, the stepped portion may be curved with respect to the central axis of the curved display device, and the display panel which is curved with respect to the central axis of the curved display device may be seated on the stepped portion of the mold frame which is curved with respect to the central axis of the curved display device.

In an exemplary embodiment of the invention, a method for manufacturing a curved display device, the method includes: disposing a display panel which is configured to display an image, in a flat state, attaching a first adhesion member along an edge area of a bottom surface of the flat-state display panel; attaching a second adhesion member to a top surface of a stepped portion of a mold frame on which the display panel will be seated, the mold frame curved with respect to a central axis of the curved display device; with the first adhesion member and the second adhesion member respectively attached to the flat-state display panel and to the curved mold frame, aging each of the first adhesion member and the second adhesion member to increase an adhesion force thereof with respect to the flat-state display panel and to the curved mold frame; with the aged first adhesion member attached to the flat-state display panel, bending the flat-state display panel to define the display panel and a display surface thereof curved with respect to the central axis of the curved display device; and coupling the curved display panel to the curved mold frame by attaching the first adhesion member and the second adhesion member to each other, to form the curved display device.

In an exemplary embodiment, the first adhesion member may include in order from the display panel: a first adhesion layer attached to the bottom surface of the display panel; a first foam layer attached to a bottom surface of the first adhesion layer; a first base film layer attached to a bottom surface of the first foam layer; and a second adhesion layer attached to a bottom surface of the first base film layer.

In an exemplary embodiment, the second adhesion member may include in order from the stepped portion of the mold frame: a third adhesion layer attached to the top surface of the stepped portion; a second foam layer attached to a top surface of the third adhesion layer; a second base film layer attached to a top surface of the second foam layer; and a fourth adhesion layer attached to a top surface of the second base film layer and the second adhesion layer.

In an exemplary embodiment, the first adhesion member may further include a first protective layer disposed on a bottom surface of the second adhesion layer, and the method may further include separating the first protective layer from a bottom surface of the second adhesion layer before the attaching the first adhesion member and the second adhesion member to each other in the coupling of the curved display panel to the curved mold frame.

In an embodiment, the second adhesion member may further include a second protective layer disposed on a top surface of the fourth adhesion layer, and the method may further include separating the second protective layer from a top surface of the fourth adhesion layer before the attaching the first adhesion member and the second adhesion member to each other in the coupling of the curved display panel to the curved mold frame.

In an exemplary embodiment, the display panel may include a display area and a non-display area. The mold frame may define an opening thereof which corresponds to the display area, and the stepped portion may surround the opening.

In an exemplary embodiment, the stepped portion may be curved with respect to the central axis of the curved display panel, and the attaching the first adhesion member and the second adhesion member to each other may include seating the curved display panel on the curved stepped portion of the mold frame in the coupling of the curved display panel to the curved mold frame.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 9 is a flowchart illustrating an exemplary embodiment of a method for manufacturing a curved display device according to the invention.

DETAILED DESCRIPTION

Figure 1:
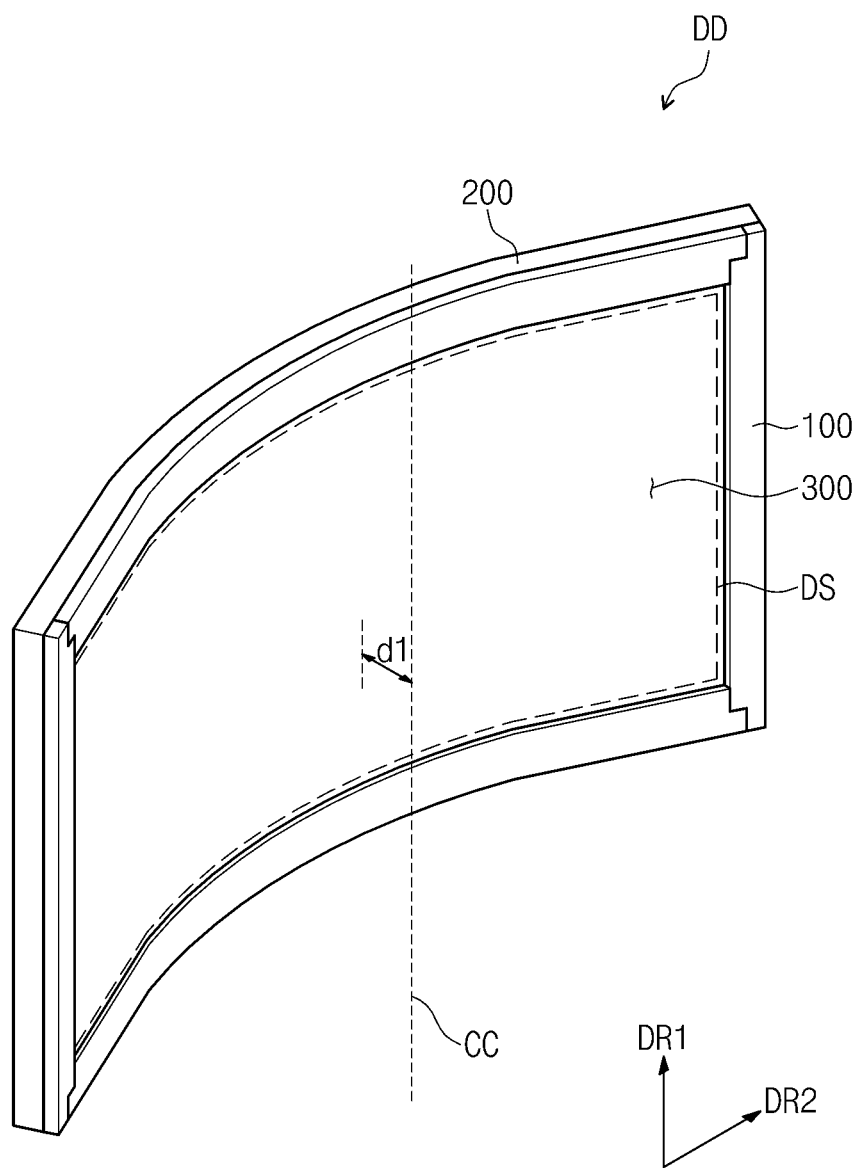
FIG. 1 is a perspective view of an exemplary embodiment of a curved display device according to the invention.

Since the present disclosure may have diverse modified embodiments, exemplary embodiments are illustrated in the drawings and are described in the detailed description of the invention. However, this does not limit the present disclosure within specific embodiments and it should be understood that the present disclosure covers all the modifications, equivalents, and replacements within the idea and technical scope of the invention.

It will be understood that when an element is referred to as being "on" another element, it can be directly on the other element or intervening elements may be present therebetween. In contrast, when an element is referred to as being "directly on" another element, there are no intervening elements present.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. The terms are only used to distinguish one component from other components. For example, a first element referred to as a first element in one embodiment can be referred to as a second element in another embodiment.

The terms of a singular form may include plural forms unless referred to the contrary. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

The meaning of 'include' or 'comprise' specifies a property, a region, a fixed number, a step, a process, an element and/or a component but does not exclude other properties, regions, fixed numbers, steps, processes, elements and/or components.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Curved display devices may include a display panel for displaying an image with light, a mold frame on which the display panel is seated, and a backlight unit providing light to the display panel. In the curved display devices, since each of the display panel and the mold frame individually has the bent shape, attachment of the display panel and the mold frame to each other may be difficult as compared to flat panel display devices.

Figure 2:
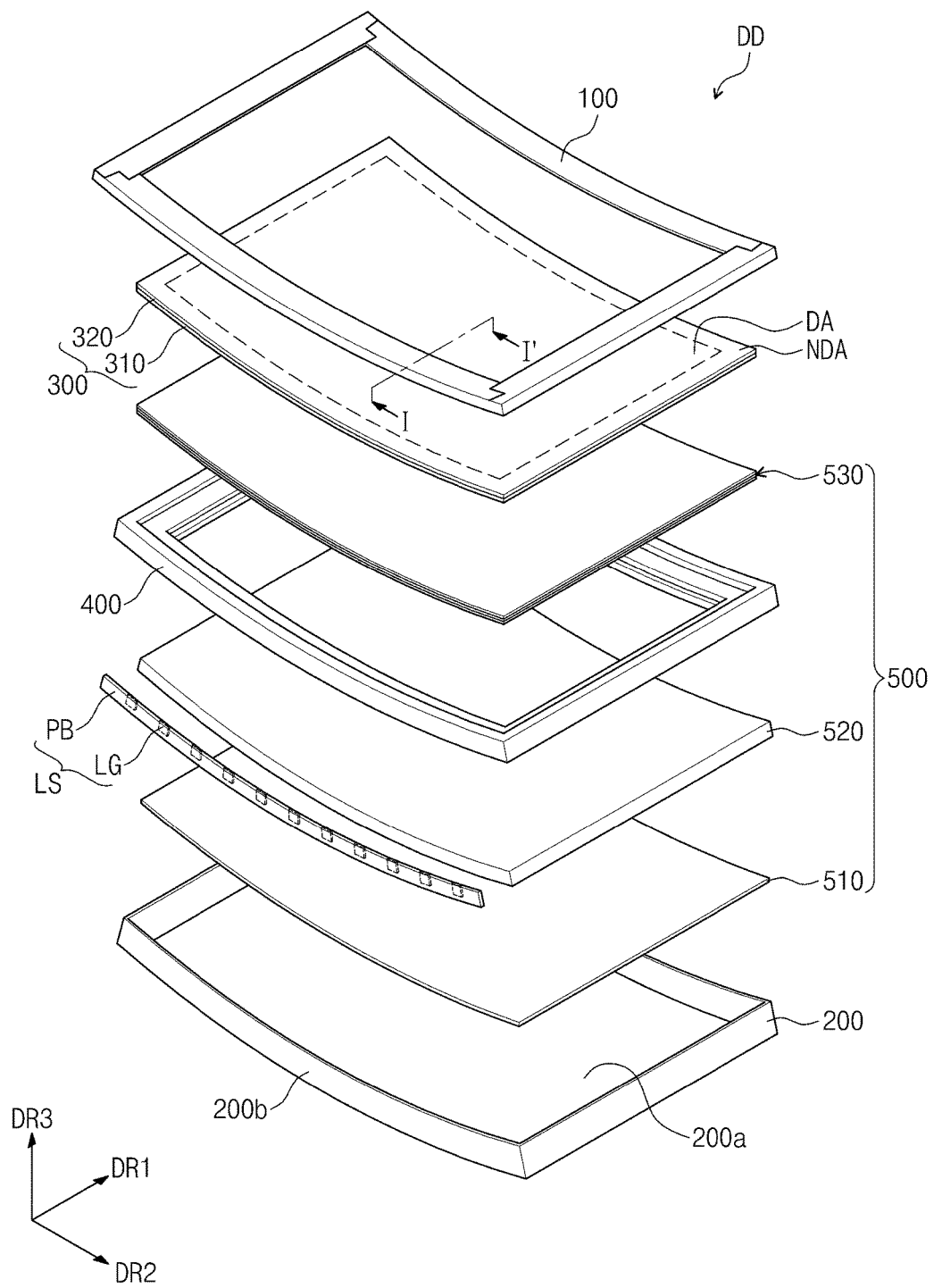
FIG. 2 is an exploded perspective view of the curved display device in FIG. 1.
Figure 3:
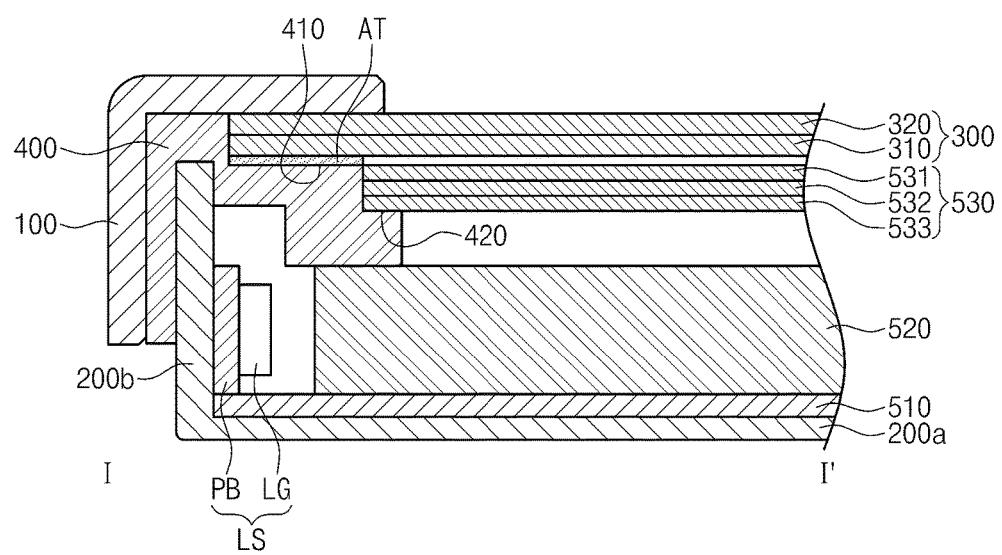
FIG. 3 is a cross-sectional view of the curved display device taken along line I-I' of FIG. 2.

FIG. 1 is a perspective view of an exemplary embodiment of a curved display device according to the invention. FIG. 2 is an exploded perspective view of the curved display device in FIG. 1. FIG. 3 is a cross-sectional view of the curved display device taken along line I-I' of FIG. 2.

According to an exemplary embodiment of the invention, a curved display device DD may be used for relatively large-sized electronic equipment such as a television or an outdoor billboard and small and medium sized electronic equipment such as a personal computer ("PC"), a notebook computer, a vehicle navigation unit and a camera. Also, according to an exemplary embodiment of the invention, the curved display device DD may include a tablet PC, a smartphone, a personal digital assistance ("PDA"), a portable multimedia player ("PMP"), a game console, a wristwatch type electronic device, and the like. These are only exemplary embodiments, and the curved display device DD may be adopted in other electronic devices when they are not deviated from a concept of the present disclosure.

Also, according to an exemplary embodiment of the invention, the curved display device DD may have an overall bent shape. As the curved display device DD has the bent shape, the curved display device DD may have or define a display surface DS having a curved shape. Through the display surface DS, an image having an improved three-dimensional effect and an improved sense of immersion and realism may be displayed.

Referring to FIG. 1, the curved display device DD may be bent about or with respect to a central axis CC. According to an exemplary embodiment, the central axis CC may be a line parallel to a first direction DR1 and spaced a predetermined distance d1 from a top surface of the curved display device DD. Here, the top surface of the curved display device DD may be a surface from which a user sees an image. The display surface DS may define the top surface of the curved display device DD. Accordingly, the display surface DS of the curved display device DD may have a curved shape bent in a second direction DR2 perpendicular to the first direction DR1.

Referring to FIG. 2, the curved display device DD includes a cover member 100, an accommodation member 200, a display panel 300, a mold frame 400, and a backlight unit 500.

The cover member 100 may be disposed on an upper portion of the display panel 300. The cover member 100 includes or defines a display area DA for allowing an image provided by the display panel 300 to pass therethrough and a non-display area NDA disposed adjacent to the display area DA. The display area DA and the non-display area NDA may define a total of an upper portion of the display panel 300. Although not shown, the cover member 100 may further include or define a window member transmitting the image to the outside through the display area DA.

The accommodation member 200 may accommodate therein the display panel 300, the mold frame 400 and the backlight unit 500 and be coupled to the cover member 100. The accommodation member 200 may include or define a bottom portion 200a and a sidewall 200b provided in plural bent from edges of the bottom portion 200a and extending in a third direction DR3. The predetermined distance d1 from which the central axis CC is spaced from the top surface of the curved display device DD extends in the third direction DR3. The third direction DR3 may be perpendicular to each of the first and second directions DR1 and DR2.

The display panel 300 may be disposed between the cover member 100 and the backlight unit 500. According to an exemplary embodiment, the display panel 300 may include a liquid crystal display panel, an organic light emitting display panel, an electrophoretic display panel and an electrowetting display panel. An exemplary embodiment of the invention is not limited to the kinds of the display panel 300. Hereinafter, according to an exemplary embodiment of the invention, a liquid crystal display panel will be described as an example.

In detail, the display panel 300 includes a first display substrate 310, a second display substrate 320, and a liquid crystal layer (not shown) disposed between the first display substrate 310 and the second display substrate 320.

Although not shown, a plurality of gate lines, a plurality of data lines, and a plurality of pixels may be disposed in the first display substrate 310. The pixels may be arranged in a matrix form in a display area of the first display substrate 310 which corresponds to the display area DA described above. Each of these pixels is connected to a corresponding gate line and a corresponding data line among the plurality of gate lines and the plurality of data lines. A common electrode and a color filter may be disposed in a display area of the second display substrate 320 which corresponds to the display area DA described above. The pixels may not be disposed in the non-display area NDA.

The mold frame 400 may have a bent shape structure to surround the central axis CC. In detail, the mold frame 400 may be disposed between the cover member 100 and the accommodation member 200 and coupled to the cover member 100 and the accommodation member 200.

According to an exemplary embodiment of the invention, as illustrated in FIG. 3, an inside of the mold frame 400 may include or define a stepped portion having a stepped shape. In detail, the stepped portion of the mold frame 400 may include a first stepped portion 410 and a second stepped portion 420 which has a height less than the first stepped portion 410, which have different heights from each other. The heights may be taken from a common reference such as the bottom portion 200a. The display panel 300 is disposed on a top surface of the first stepped portion 410, and optical sheets 530 are disposed on a top surface of the second stepped portion 420.

Also, the difference in the heights of the first stepped portion 410 and the second stepped portion 420 from the common reference, may be set to make a predetermined gap in the third direction DR3 between the optical sheets 530 and the display panel 300.

The backlight unit 500 may be disposed between the display panel 300 and the accommodation member 200. In detail, the backlight unit 500 includes a reflective plate 510, a light guide plate 520, the plurality of optical sheets 530, and a light source LS.

The reflective plate 510 may be disposed between the light guide plate 520 and the accommodation member 200. The reflective plate 510 may include a light reflecting material such as polyethylene terephthalate ("PET") and aluminum. Accordingly, the reflective plate 510 may be disposed on a lower portion of the light guide plate 520 to re-reflect light transmitted from the light guide plate 520 to the display panel 300.

The light guide plate 520 may be disposed between the optical sheets 530 and the reflective plate 510 and be accommodated in the accommodation member 200. The light guide plate 520 defines a light emitting surface facing the display panel 300, a rear surface opposite to the light emitting surface, and side surfaces which connect the light emitting surface to the rear surface. One side surface, which lengthwise extends in the second direction DR2, among the side surfaces of the light guide plate 520 may face the light source LS. That is, the light guide plate 520 may receive light emitted from a plurality of light emitting elements LG of the light source LS through the one side surface and transfer the received light to the display panel 300. The side surface of the light guide plate 520 through which the light is received may be a light incident surface of the light guide plate 520.

Also, although not shown, all of the side surfaces, which lengthwise extend in the second direction DR2, among the side surfaces of the light guide plate 520 may face a light source LS. Here, two light sources LS that are spaced apart from each other in the first direction DR1 with the light guide plate 520 therebetween may be provided.

The optical sheets 530 may be disposed between the display panel 300 and the light guide plate 520 and on the top surface of the second stepped portion 420 of the mold frame 400. These optical sheets 530 may adjust a path of light that is emitted from the light guide plate 520 and incident into the display panel 300.

In an exemplary embodiment, for example, as illustrated in FIG. 3, the optical sheets 530 may be disposed on the second stepped portion 420 of the mold frame 400. Here, the optical sheets 530 may include an upper diffusion sheet 531 and a lower diffusion sheet 533, which diffuse the light emitted from the light guide plate 520, and a prism sheet 532 collecting the light emitted from the light guide plate 520. The upper diffusion sheet 531 is disposed on an upper portion of the prism sheet 532, and the lower diffusion sheet 533 is disposed on a lower portion of the prism sheet 532.

The light source LS includes a light emitting element LG provided in plural and a printed circuit board PB on which the light emitting elements LG are disposed. The light source LS may be accommodated in the accommodation member 200 to face one side surface among the side surfaces of the light guide plate 520.

The printed circuit board PB may have a shape of which a length thereof extends in the second direction DR2, and the light emitting elements LG may be arranged on the printed circuit board PB in the second direction DR2. These light emitting elements LG may generate light to display an image and output the generated light to the one side surface of the light guide plate 520.

As illustrated in FIG. 3, the display panel 300 may be attached to the mold frame 400 by using an adhesion member AT. The adhesion member AT may be an adhesive tape, a silicone adhesion member or an epoxy adhesion member. For convenience of description, the adhesion member AT will be hereinafter referred to as an adhesion tape AT. In detail, the adhesion tape AT may be disposed between the top surface of the first stepped portion 410 of the mold frame 400 and the first display substrate 310 of the display panel 300.

In general, when the display panel is coupled to the mold frame in a flat (e.g., non-curved) display device, the display panel and the stepped portion of the mold frame may be attached to each other by using one adhesion tape. Here, the adhesion tape may be a double-sided adhesion tape. In the non-curved display device, as the display panel is coupled to the mold frame, one surface of the adhesion tape is attached to the display panel, and the other (opposing) surface of the adhesion tape is attached to the top surface of the stepped portion of the mold frame. Then, over time, the adhesion tape ages to increase an adhesion force of the adhesion tape to respective surfaces of the display panel and the mold frame. Here, in the non-curved display device, an adhesive force of the adhesion tape attached to the display panel and the mold frame may further increase as time elapses. That is, the aging time may be defined as an elapsed time for increasing the adhesion force of the adhesion tape. As a result, an adhesion force between the display panel and the mold frame may further increase through the aging time.

Similarly, for the curved display device, after the display panel and the mold frame are attached to each other by using the adhesion tape, the aging time is necessary to increase the adhesion force of the adhesion tape to respective surfaces of the display panel and the mold frame. For the curved display device, during the aging time for increasing the adhesion force between the bent display panel and the bent mold frame, a curved shape of the bent display is fixed such as by using a jig. The jig is used to maintain curvature characteristics of the bent display panel. However, during the aging time for increasing the adhesion force between the display panel and the mold frame, the curved display panel may be damaged by the jig.

According to an exemplary embodiment of the invention, the adhesion tape AT may be attached to each of the display panel 300 and the mold frame 400. That is, the adhesion tape AT according to an exemplary embodiment of the invention may be provided in plural respectively attached to each of the display panel 300 and the mold frame 400.

Especially, according to an exemplary embodiment of the invention, the aging time for the adhesion tapes respectively attached to the display panel 300 and the mold frame 400 may be performed before the display panel 300 and the mold frame 400 are attached to each other. The aging time of the adhesion tape AT attached to the display panel 300 may be performed with the display panel 300 in a flat (e.g., non-curved) state thereof. Also, according to an exemplary embodiment, after the aging time for the adhesion tape attached to the display panel 300 has completed, the display panel 300 may be bent from the flat state thereof with reference to the central axis CC.

Then, as the display panel 300 is coupled to the mold frame 400, the aged adhesion tape attached to the display panel 300 and the aged adhesion tape attached to the mold frame 400 may be attached to each other. Here, after the display panel 300 is coupled to the mold frame 400, a separate aging time is not necessary. That is, as the aged adhesion tape attached to the display panel 300 is coupled to the aged adhesion tape attached to the mold frame 400, the adhesion force therebetween may further increase.

Thus, in the curved display device DD according to an exemplary embodiment of the invention, a manufacturing process thereof may be simplified and damage to the display panel may be reduced or effectively prevented. Detailed description for this will be explained through FIGS. 5 to 8.

Figure 4A:
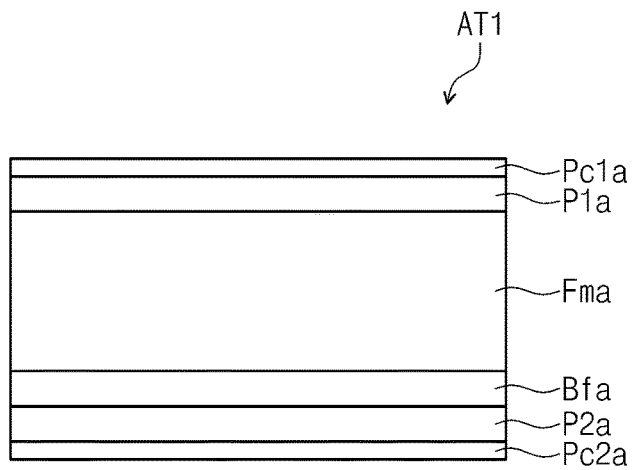
FIG. 4A is a cross-sectional view of an exemplary embodiment of an adhesion member of the curved display device in FIG. 3 according to the invention.
Figure 4B:
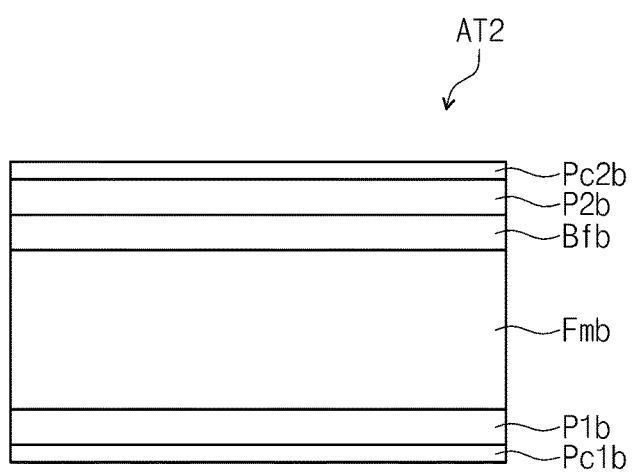
FIG. 4B is a cross-sectional view of another exemplary embodiment of an adhesion member of the curved display device in FIG. 3 according to the invention.

FIG. 4A is a cross-sectional view of an exemplary embodiment of an adhesion tape of the curved display device in FIG. 3 according to the invention. FIG. 4B is a cross-sectional view of another exemplary embodiment of an adhesion tape of the curved display device in FIG. 3 according to the invention.

According to an exemplary embodiment of the invention, the adhesion tape AT illustrated in FIG. 3 may collectively include a first adhesion tape AT1 and a second adhesion tape AT2.

In detail, the first adhesion tape AT1 in FIG. 4A may be disposed on the lower portion of the display panel (see reference numeral 300 in FIG. 3) and attached to the bottom surface of the display panel 300 and to an upper surface of the second adhesion tape AT2. The second adhesion tape AT2 in FIG. 4B may be disposed on the top surface of the first stepped portion 410 of the mold frame (see reference numeral 400 in FIG. 3) and attached to the top surface of the first stepped portion 410 and to a lower surface of the first adhesion tape AT1. The top surface of the display panel 300 may be a surface thereof facing the cover member 100, and the bottom surface of the display panel 300 may be defined as a surface thereof facing the backlight unit 500. The top surface of the first stepped portion 410 may be defined as a surface thereof facing the display panel 300, and the bottom surface of the first stepped portion 410 may be defined as a surface thereof facing the accommodation member 200.

Firstly, referring to FIGS. 3 and 4A, an exemplary embodiment of the first adhesion tape AT1 according to the invention includes a first base film layer Bfa, a first foam layer Fma, first and second adhesion layers P1a and P2a, and first and second protective layers Pc1a and Pc2a.

The first base film layer Bfa may be a support member that supports a shape of and remaining layers of the overall first adhesion tape AT1.

The first foam layer Fma is attached to a top surface of the first base film layer Bfa. The first foam layer Fma may be a layer which increases an adhesion force between the first adhesion tape AT1 and an object to which the first adhesion tape AT1 is attached, and may be made of or include an elastic material such as a rubber material. That is, the first foam layer Fma serves to uniformly attach the first and second adhesion layers P1a and P2a to an adhesion surface of the object. Here, the object may be the display panel 300. Although the first foam layer Fma is made of or includes rubber, the invention is not limited thereto.

The first adhesion layer P1a is attached to a top surface of the first foam layer Fma. The second adhesion layer P2a may be attached to a bottom surface of the first base film layer Bfa.

The first protective layer Pc1a is attached to a top surface of the first adhesion layer P1a and maintains an adhesion force of the first adhesion layer P1a. When the first protective layer Pc1a is separated from the first adhesion layer P1a, the adhesion force of the first adhesion layer P1a may decrease. The first protective layer Pc1a is removably attached to the first adhesion layer P1a. The second protective layer Pc2a is attached to a bottom surface of the second adhesion layer P2a and maintains an adhesion force of the second adhesion layer P2a. Likewise, when the second protective layer Pc2a is separated from the second adhesion layer P2a, the adhesion force of the second adhesion layer P2a may decrease. The second protective layer Pc2a is removably attached to the second adhesion layer P2a.

Also, referring to FIG. 4B, the second adhesion tape AT2 includes a second base film layer Bfb, a second foam layer Fmb, third and fourth adhesion layers P1b and P2b, and third and fourth protective layers Pc1b and Pc2b.

The second base film layer Bfb may be a support member that supports a shape of remaining layers of the overall second adhesion tape AT2.

The second foam layer Fmb is attached to a bottom surface of the second base film layer Bfb. The second foam layer Fmb may be a layer which increases an adhesion force between the second adhesion tape AT2 and an object to which the second adhesion tape AT2 is attached, and may be made of or include a rubber material. The second foam layer Fmb serves to uniformly attach the third and fourth adhesion layers P1b and P2b to an adhesion surface of the object. Here, the object may be the mold frame 400. Although the second foam layer Fmb is made of or includes rubber, the invention is not limited thereto.

The third adhesion layer P1b may be attached to a bottom surface of the second foam layer Fmb, and the fourth adhesion layer P2b may be attached to a top surface of the second base film layer Bfb.

The third protective layer Pc1b is attached to a bottom surface of the third adhesion layer P1b and maintains an adhesion force of the third adhesion layer P1b. When the third protective layer Pc1b is separated from the third adhesion layer P1b, the adhesion force of the third adhesion layer P1b may decrease. The third protective layer Pc1b is removably attached to the third adhesion layer P1b. The fourth protective layer Pc2b is attached to a top surface of the fourth adhesion layer P2b and maintains an adhesion force of the fourth adhesion layer P2b. When the fourth protective layer Pc2b is separated from the fourth adhesion layer P2b, the adhesion force of the fourth adhesion layer P2b may decrease. The fourth protective layer Pc2b is removably attached to the fourth adhesion layer P2b.

According to an exemplary embodiment, a bottom surface of the first display substrate 310 of the display panel 300 may be attached to the first adhesion layer P1a. In attaching the display panel 300 to the first adhesion tape AT1, the first protective layer Pc1a is removed to expose the first adhesion layer P1a, and then the bottom surface of the display panel 300 may be attached to the exposed first adhesion layer P1a.

According to an exemplary embodiment, the top surface of the first stepped portion 410 of the mold frame 400 may be attached to the third adhesion layer P1b. In attaching the mold frame 400 to the second adhesion tape AT2, the third protective layer Pc1b is removed to expose the third adhesion layer P1b, and then the top surface of the first stepped portion 410 of the mold frame 400 may be attached to the exposed third adhesion layer P1b. As a result, to couple the display panel 300 to the mold frame 400, the second adhesion layer P2a of the first adhesion tape AT1 and the fourth adhesion layer P2b of the second adhesion tape AT2 may be attached to each other.

With the first and second adhesion tapes AT1 and AT2 respectively attached to the display panel 300 and the mold frame 400, the second and fourth protective layers Pc2a and Pc2b are removed from the first and second adhesion tapes AT1 and AT2 to expose the second and fourth adhesion layers P2a and P2b. Then, the exposed second and fourth adhesion layers P2a and P2b may be attached to each other.

Although the first adhesion tape AT1 and the second adhesion tape AT2 have structures different from each other as illustrated in FIGS. 4A and 4B, the invention is not limited thereto. That is, the first adhesion tape AT1 and the second adhesion tape AT2 may have variously modified structures and be respectively attached to the display panel 300 and the mold frame 400.

Figure 5A:
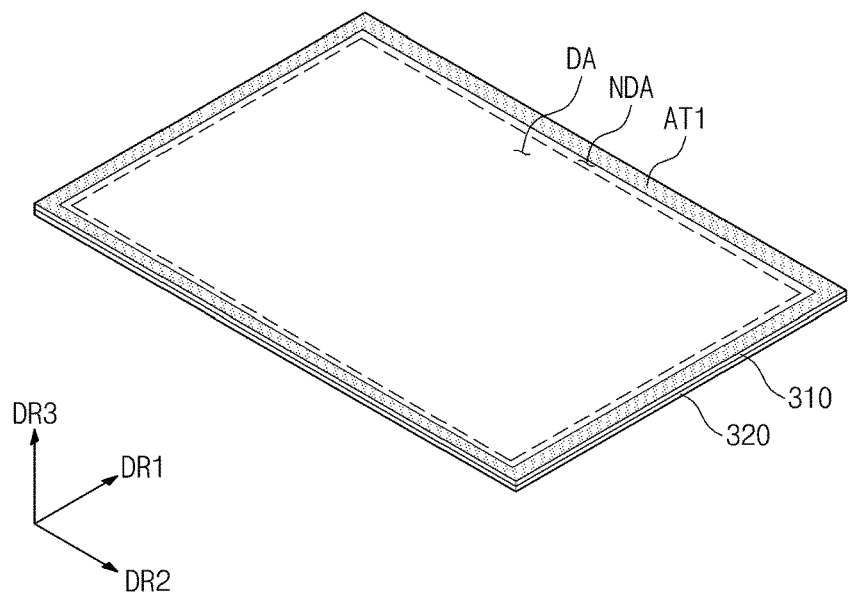
FIG. 5A is a perspective view of an exemplary embodiment of a flat state of a first adhesion member attached to a display panel according to the invention.
Figure 5B:
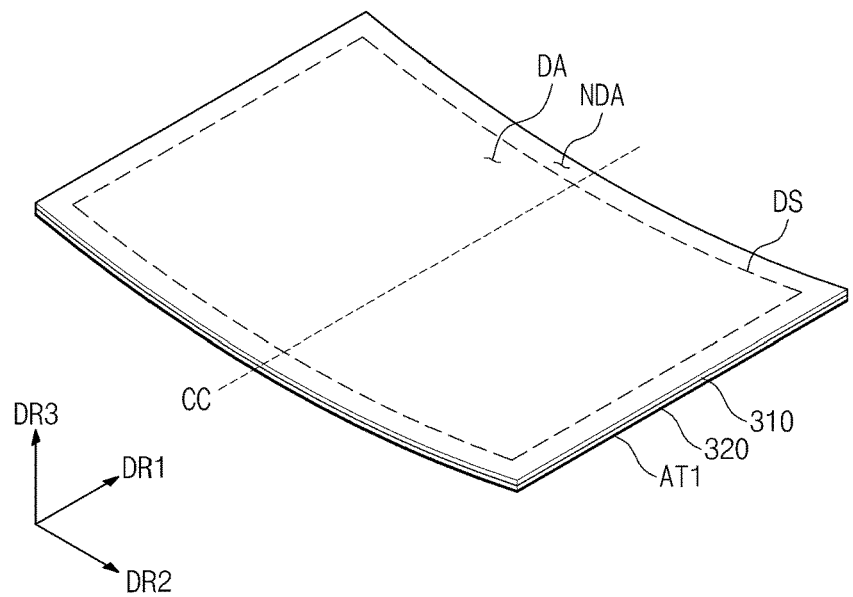
FIG. 5B is a perspective view illustrating an exemplary embodiment of a bent state of the first adhesion member attached to the display panel in FIG. 5A.

FIG. 5A is a perspective view of an exemplary embodiment of a flat state of the first adhesion tape attached to the display panel of a curved display device according to the invention. FIG. 5B is a perspective view illustrating an exemplary embodiment of a bent state of the first adhesion tape attached to the display panel in FIG. 5A.

Referring to FIGS. 5A and 5B, in the third direction DR3, the first adhesion tape AT1 is disposed on the bottom surface of the first display substrate 310, and the second display substrate 320 is disposed on the top surface of the first display substrate 310.

According to an exemplary embodiment of the invention, the first adhesion tape AT1 may be attached to the display panel 300 in a flat state thereof before the display panel 300 is bent. Especially, the first adhesion tape AT1 may be attached to an edge area of the bottom surface of the first display substrate 310. Here, the non-display area NDA may include or define the edge area of the bottom surface of the first display substrate 310. The first adhesion tape AT1 attached to the display panel 300 exposes the display area DA thereof.

Also, according to an exemplary embodiment, after the first adhesion tape AT1 is attached to the edge area of the bottom surface of the first display substrate 310, the aging time may be performed. As a result, after a predetermined time elapses, the adhesion force of the first adhesion tape AT1 attached to the edge area of the bottom surface of the first display substrate 310 may increase. Here, in an assembled state of the display panel 300 and the mold frame 400, the edge area of the bottom surface of the first display substrate 310 may overlap at least a portion of the top surface of the first stepped portion (see reference numeral 410 in FIG. 6).

With the aging time completed, as illustrated in FIG. 5B, the display panel 300 with the first adhesion tape AT1 attached to the edge area of the bottom surface of the first display substrate 310 may be bent so that the display surface DS is positioned above the central axis CC. Thus, in an exemplary embodiment, the display surface DS of the curved display device DD according to the invention may have a curved shape bent in the second direction DR2 which is perpendicular to the first direction DR1.

Figure 6:
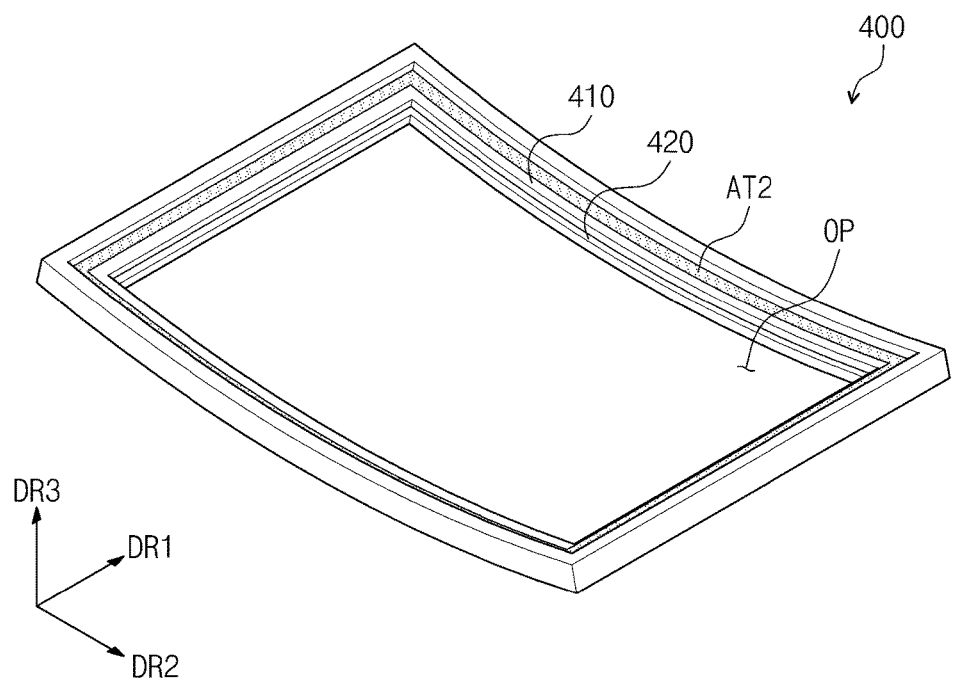
FIG. 6 is a perspective view of an exemplary embodiment of a second adhesion member attached to a mold frame of a curved display device according to the invention.

FIG. 6 is a perspective view of an exemplary embodiment of the second adhesion tape attached to the mold frame of a curved display device according to the invention.

According to an exemplary embodiment, the mold frame 400 may have a bent shape. That is, like the display panel (see reference numeral 300 in FIG. 2), as illustrated in FIG. 5B, the mold frame 400 may have a bent shape about the central axis CC to surround the central axis CC.

Referring to FIG. 6, an inside of the mold frame 400 includes or defines the first stepped portion 410 and the second stepped portion 420, each of which has a stepped shape. The first and second stepped portions 410 and 420 may be defined by a portion of the mold frame 400 including horizontal surfaces and an entire of thicknesses (in the third direction DR3) at the horizontal surfaces. Here, in the third direction DR3, the first stepped portion 410 and the second stepped portion 420 may have heights different from each other. The upper surfaces of the first and second stepped portions 410 and 420 area not coplanar with each other to be disposed spaced apart from each other in the third direction DR3. As described in FIG. 3, the display panel 300 may be seated on the first stepped portion 410, and the optical sheets 530 may be seated on the second stepped portion 420.

Also, according to an exemplary embodiment, an opening OP for providing light emitted from the backlight unit (see reference numeral 500 in FIG. 2) to the display panel 300 may be defined in the mold frame 400. This opening OP may correspond to the display area (see reference symbol DA in FIG. 5A).

Unlike the display panel 300, an exemplary embodiment of the mold frame 400 according to the invention may be manufactured in the bent shape. That is, when compared with the display panel 300, a separated bending operation from a flat state to a bent state is not necessary. As a result, the second adhesion tape AT2 may be attached to the bent shaped mold frame 400 in a bent state thereof. The second adhesion tape AT2 may be attached to the top surface of the first stepped portion 410 to surround the opening OP in a top plan view.

Figure 7:
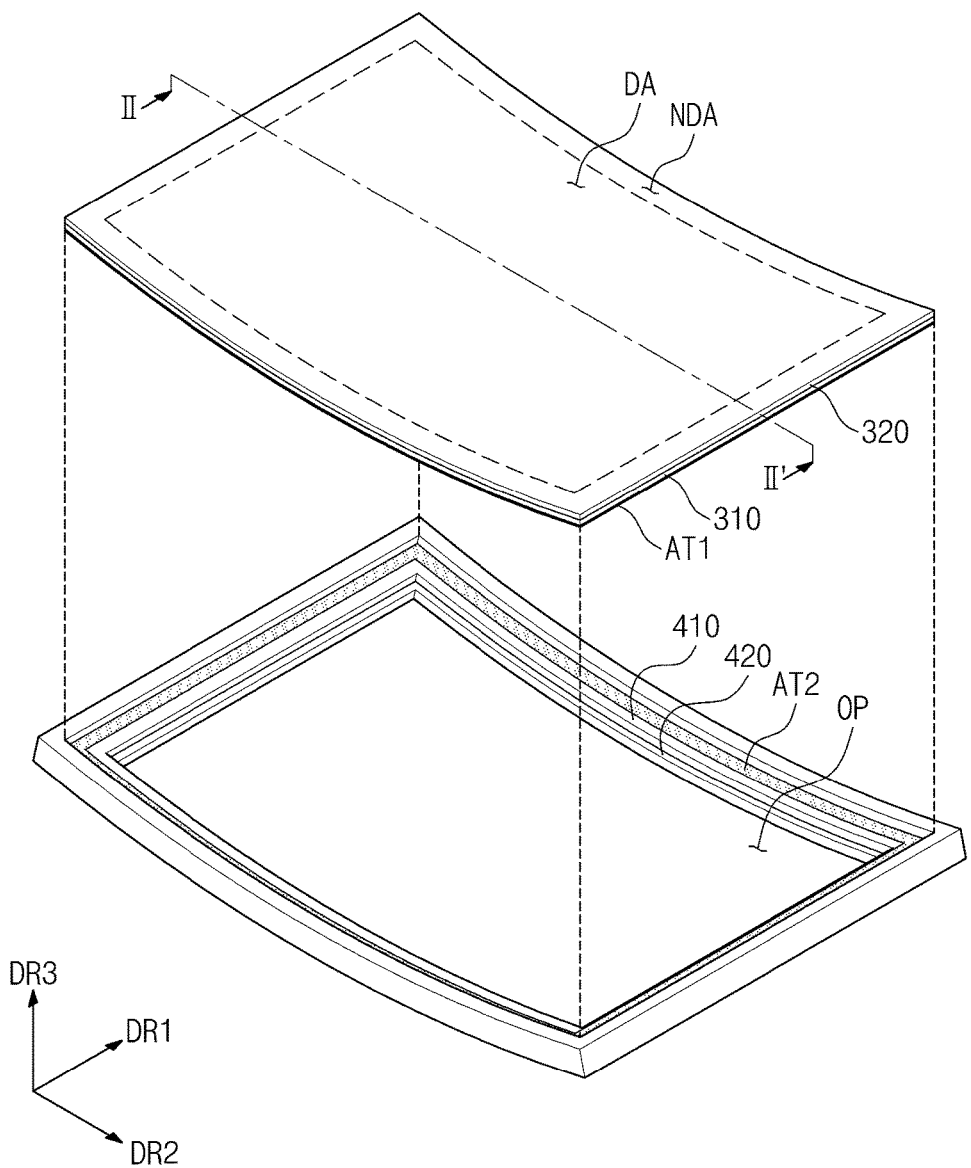
FIG. 7 is a perspective view illustrating an exemplary embodiment of a method for attaching the display panel in FIG. 5B to the mold frame in FIG. 6 according to the invention.
Figure 8:
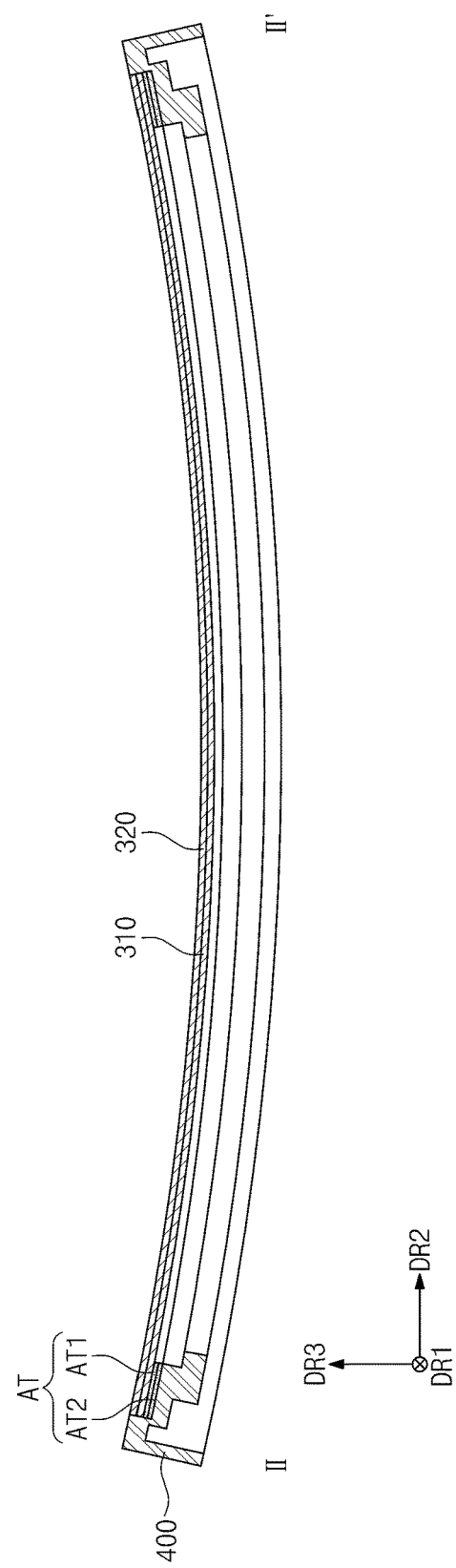
FIG. 8 is a cross-sectional view taken along line II-II' of FIG. 7.

FIG. 7 is a perspective view illustrating an exemplary embodiment of a method for attaching the display panel in FIG. 5B to the mold frame in FIG. 6 according to the invention. FIG. 8 is a cross-sectional view taken along line II-II' of FIG. 7; FIG. 9 is a flowchart illustrating an exemplary embodiment of a method for manufacturing a curved display device according to the invention.

Referring to FIGS. 2 and 7 to 9, in a first process S110, the first adhesion tape AT1 is attached to the edge area of the bottom surface of the display panel 300. Here, in an assembled state of the curved display device, the first adhesion tape AT1 may be disposed at a position between the first display substrate 310 and the first stepped portion 410 of the mold frame in the third direction DR3.

In a second process S120, the second adhesion tape AT2 is attached to the top surface of the first stepped portion 410 of the mold frame 400. The second adhesion tape AT2 may be attached to the top surface of the first stepped portion 410 to surround the opening OP.

While FIG. 9 shows the first process S110 before the second process S120, in exemplary embodiments, the first process S110 and the second process S120 may be exchanged with each other. That is, the second adhesion tape AT2 may be attached to the top surface of the first stepped portion 410, and then the first adhesion tape AT1 may be attached to the bottom surface of the first display substrate 310.

In a third process S130, the aging of each of the first adhesion tape AT1 and the second adhesion tape AT2 may be performed, over a time to define the respective aging time. Especially, during the aging time of the first adhesion tape AT1, the display panel 300 may have a flat shape instead of a bent shape. Accordingly, during the aging time of the first adhesion tape AT1 attached to the display panel 300 in the flat state thereof, fixing the display panel 300 in an external jig is obviated and damage to the display panel 300 may be reduced or effectively prevented.

In a fourth process S140, with the aged first adhesion tape AT1 thereon, the display panel 300 is bent from a flat state thereof so that the display surface DS of the display panel 300 surrounds the central axis CC.

In a fifth process S150, the bent display panel 300 in the curved state thereof and the bent mold frame 400 in the curved state thereof are coupled to each other so that the first adhesion tape AT1 and the second adhesion tape AT2 are attached to each other. Here, the display panel 300 in the curved state thereof is fixed by the external jig or the like, and then attached to the top surface of the first stepped portion 410 of the mold frame 400 in the bent state thereof, in the third direction DR3. As a result, the first adhesion tape AT1 and the second adhesion tape AT2 may be attached to each other.

As illustrated in FIG. 8, when the bent display panel 300 and the bent mold frame 400 are coupled to each other, the first adhesion tape AT1 and the second adhesion tape AT2 are attached to each other.

According to exemplary embodiments of the invention, since an adhesion member attached to objects which will be coupled to each other are aged while being on the objects unattached to each other, the method for attaching the display panel to the mold frame may be simplified, and the adhesion efficiency may be further improved.

The invention has been particularly shown and described in the drawings and the specification with reference to exemplary embodiments thereof. While specific terms were used, they were not used to limit the meaning or the scope of the invention described in claims, but merely used to explain the invention. Accordingly, a person having ordinary skill in the art will understand from the above that various modifications and other equivalent embodiments are also possible. Hence, the real protective scope of the invention shall be determined by the technical scope of the accompanying claims.

What is claimed is:

1. A curved display device comprising:
a display panel which is curved with respect to a central axis of the curved display device to define a display surface which is curved with respect to the central axis of the curved display device;
a first adhesion member attached to an edge area of a bottom surface of the display panel;
a mold frame which is curved with respect to the central axis of the curved display device, the mold frame defining a stepped portion on which the display panel is seated; and
a second adhesion member directly attached to a top surface of the stepped portion and to the first adhesion member which is attached to the edge area of the bottom surface of the display panel.

2. The curved display device of claim 1, wherein the display panel comprises:
a first display substrate; and
a second display substrate disposed on the first display substrate, and
the first adhesion member is attached to an edge area of a bottom surface of the first display substrate of the display panel.

3. The curved display device of claim 2, wherein the first adhesion member comprises in order from the display panel:
a first adhesion layer attached to the bottom surface of the first display substrate of the display panel;
a first foam layer attached to a bottom surface of the first adhesion layer;
a first base film layer attached to a bottom surface of the first foam layer; and
a second adhesion layer attached to a bottom surface of the first base film layer.

4. The curved display device of claim 3, wherein the second adhesion member comprises in order from the stepped portion of the mold frame:
a third adhesion layer attached to the top surface of the stepped portion;
a second foam layer attached to a top surface of the third adhesion layer;
a second base film layer attached to a top surface of the second foam layer; and
a fourth adhesion layer attached to a top surface of the second base film layer and to the second adhesion layer of the first adhesion member.

5. The curved display device of claim 2, wherein the edge area of the bottom surface of the first display substrate of the display panel overlaps a portion of the top surface of the stepped portion of the mold frame.

6. The curved display device of claim 1, wherein the display panel comprises: a display area in which pixels are disposed and an image is displayed, and a non-display area in which the image is not displayed, and
the mold frame defines an opening thereof which corresponds to the display area of the display panel, and the stepped portion of the mold frame defines and surrounds the opening thereof.

7. The curved display device of claim 1, wherein each of the first and second adhesion members is a double-sided adhesion tape.

8. The curved display device of claim 1, wherein
the stepped portion of the mold frame is curved with respect to the central axis of the curved display device, and
the display panel which is curved with respect to the central axis of the curved display device is seated on the stepped portion of the mold frame which is curved with respect to the central axis of the curved display device.

9. A method for manufacturing a curved display device, the method comprising:
disposing a display panel which is configured to display an image, in a flat state,
attaching a first adhesion member along an edge area of a bottom surface of the flat-state display panel;
attaching a second adhesion member to a top surface of a stepped portion of a mold frame, the mold frame curved with respect to a central axis of the curved display device;
with the first adhesion member and the second adhesion member respectively attached to the flat-state display panel and to the curved mold frame, aging each of the first adhesion member and the second adhesion member to increase an adhesion force thereof with respect to the flat-state display panel and to the curved mold frame;
with the aged first adhesion member attached to the flat-state display panel, bending the flat-state display panel to define the display panel and a display surface thereof curved with respect to the central axis of the curved display device; and
coupling the curved display panel to the curved mold frame by attaching the first adhesion member and the second adhesion member to each other, to form the curved display device.

10. The method of claim 9, wherein the first adhesion member comprises in order from the display panel:
a first adhesion layer attached to the bottom surface of the display panel;
a first foam layer attached to a bottom surface of the first adhesion layer;
a first base film layer attached to a bottom surface of the first foam layer; and
a second adhesion layer attached to a bottom surface of the first base film layer.

11. The method of claim 10, wherein the second adhesion member comprises in order from the stepped portion of the mold frame:
a third adhesion layer attached to the top surface of the stepped portion;
a second foam layer attached to a top surface of the third adhesion layer;
a second base film layer attached to a top surface of the second foam layer; and
a fourth adhesion layer attached to a top surface of the second base film layer and the second adhesion layer.

12. The method of claim 11, wherein
the first adhesion member further comprises a first protective layer disposed on a bottom surface of the second adhesion layer, and
the method further comprises separating the first protective layer from the bottom surface of the second adhesion layer before the attaching the first adhesion member and the second adhesion member to each other in the coupling of the curved display panel to the curved mold frame.

13. The method of claim 11, wherein
the second adhesion member further comprises a second protective layer disposed on a top surface of the fourth adhesion layer, and
the method further comprises separating the second protective layer from a top surface of the fourth adhesion layer before the attaching the first adhesion member and the second adhesion member to each other in the coupling of the curved display panel to the curved mold frame.

14. The method of claim 9, wherein
the display panel comprises a display area in which pixels are disposed and an image is displayed, and a non-display area in which the image is not displayed, and
the mold frame defines an opening thereof which corresponds to the display area of the display panel, and the stepped portion of the mold frame surrounds the opening thereof.

15. The method of claim 9, wherein the stepped portion of the mold frame is curved with respect to the central axis of the curved display panel, and
the attaching the first adhesion member and the second adhesion member to each other comprises seating the curved display panel on the curved stepped portion of the mold frame in the coupling of the curved display panel to the curved mold frame.

\* \* \* \* \*